United States Patent [19]
Lopez et al.

[11] Patent Number: 6,130,506
[45] Date of Patent: *Oct. 10, 2000

[54] APPARATUS FOR REGULATING THE ILLUMINATION FIELD ID A VEHICLE HEADLIGHT

[75] Inventors: Eladio Lopez, La Croix sur Lutry; Dominique Marchal, Vallorbe; Philippe Schweizer, Lonay, all of Switzerland

[73] Assignee: Robert Bosch GmbH, Stuttgart, Germany

[ * ] Notice: This patent is subject to a terminal disclaimer.

[21] Appl. No.: 09/020,007

[22] Filed: Feb. 6, 1998

[30] Foreign Application Priority Data

Feb. 6, 1997 [DE] Germany .............. 197 04 466

[51] Int. Cl.⁷ ............................................. H05B 37/00
[52] U.S. Cl. ........................ 315/82; 362/71; 307/10.8
[58] Field of Search ............................ 315/82, 77, 76; 362/66, 71; 307/10.8

[56] References Cited

U.S. PATENT DOCUMENTS

| | | | |
|---|---|---|---|
| 4,620,267 | 10/1986 | Cibie | 362/71 |
| 4,781,465 | 11/1988 | Demachi et al. | 356/371 |
| 5,193,894 | 3/1993 | Lietar et al. | 362/66 |
| 5,633,710 | 5/1997 | Kumra et al. | 356/139.08 |

FOREIGN PATENT DOCUMENTS

| | | |
|---|---|---|
| 0 021 890 | 1/1981 | European Pat. Off. . |
| 0 186 571 A1 | 7/1986 | European Pat. Off. . |
| 2707390 | 1/1995 | France . |
| 38 27 149 A1 | 3/1989 | Germany . |
| 43 31 409 A1 | 6/1995 | Germany . |
| 43 41 409 A1 | 6/1995 | Germany . |

*Primary Examiner*—David Vu
*Attorney, Agent, or Firm*—Michael J. Striker

[57] ABSTRACT

A headlight illumination field regulating apparatus includes an electromagnetic radiation emitter, a reflected radiation sensor, a comparing element, and a unit for adjusting the alignment position of the headlights. The electromagnetic radiation emitter operates to radiate two electromagnetic radiation beams on the road to the front of the automobile and the reflected radiation sensor senses reflected radiation and determines a relationship of a sensed characteristic of the first radiation beam and a sensed characteristic of the second radiation beam and creates a data point representative of the irradiated spot. The comparing element thereafter compares the determined relationship between the sensed reflected radiation characteristics with a predetermined desired position and subsequently generate a correction signal to control the regulation or adjustment of the headlights into a proper light projecting orientation which ensures a proper projection limit of the beam of the headlight.

13 Claims, 6 Drawing Sheets

APPARATUS FOR REGULATING THE ILLUMINATION FIELD ID A VEHICLE HEADLIGHT

BACKGROUND OF THE INVENTION

The present invention relates to an apparatus for regulating the illumination field of a vehicle headlight.

German patent document DE 43 41 409 A1 discloses a headlight illumination field regulating apparatus having an electromagnetic radiation emitter, a reflected radiation sensor, an evaluation unit, and a unit for adjusting the alignment position of the headlights. The electromagnetic radiation emitter operates to radiate electromagnetic radiation on the road to the front of the automobile and the reflected radiation sensor senses reflected radiation and creates a data point representative of the irradiated spot.

The evaluation unit evaluates the data points to establish the position of the detected spot or area and thereafter compares the evaluated position with a predetermined desired position and subsequently generate a correction signal to control the regulation or adjustment of the headlights into a proper light projecting orientation which ensures a proper projection limit of the beam of the headlight. In the event that the inclination of the vehicle in the fore and after direction—namely, relative to its direction of travel—changes, this disclosed regulating apparatus can accommodate such inclinations and control the orientation of the headlights to maintain the proper projection limit of their beams. However, imprecision in the regulation of the headlights can arise from the circumstance that the projection limit of the headlight beam is influenced by in its inclination. This imprecision is magnified the smaller the projection limits of the headlight beam.

SUMMARY OF THE INVENTION

The present invention advantageously eliminates the influence of changes of inclination of a vehicle on the illumination field of the vehicle/Es running lights such as, for example, its headlights. According to one aspect of the present invention, there is provided an apparatus for regulating the illumination field of a running light of a vehicle, the running light being of the type for illuminating a region forward of the vehicle relative to the vehicle/Es direction of travel and the vehicle being of the type having an adjusting element for adjusting the orientation of the running light to thereby vary the position of the illumination field relative to the vehicle. The apparatus includes a member for irradiating at least a first and a second area on the road surface with a first and a second radiation beam, respectively, in a manner in which at least some of the radiation beam is reflected from the respective irradiated area, the first area on the road surface being at a different spacing from the vehicle than the second area relative to the direction of travel of the vehicle.

The apparatus in the one aspect of the present invention also includes a sensor for sensing a characteristic of radiation reflected from the irradiated first and second areas on the road surface. The apparatus further includes means for determining a relationship of a sensed characteristic of radiation reflected from the first area on the road with a sensed characteristic of radiation reflected from the second area on the road. Additionally, the apparatus includes means for comparing the determined relationship of the sensed reflected radiation characteristics with a radiation characteristic representative of a predetermined proper position of the illumination field of the running light, the comparing means being operatively connected with the adjusting element for providing a signal thereto in response to which the adjusting element can adjust the orientation of the running light on the vehicle and thereby reorient the running light into a position in which the light projected therefrom illuminates the proper illumination field.

DETAILED DESCRIPTION OF THE PREFERRED EMBODIMENTS

Figure 1:
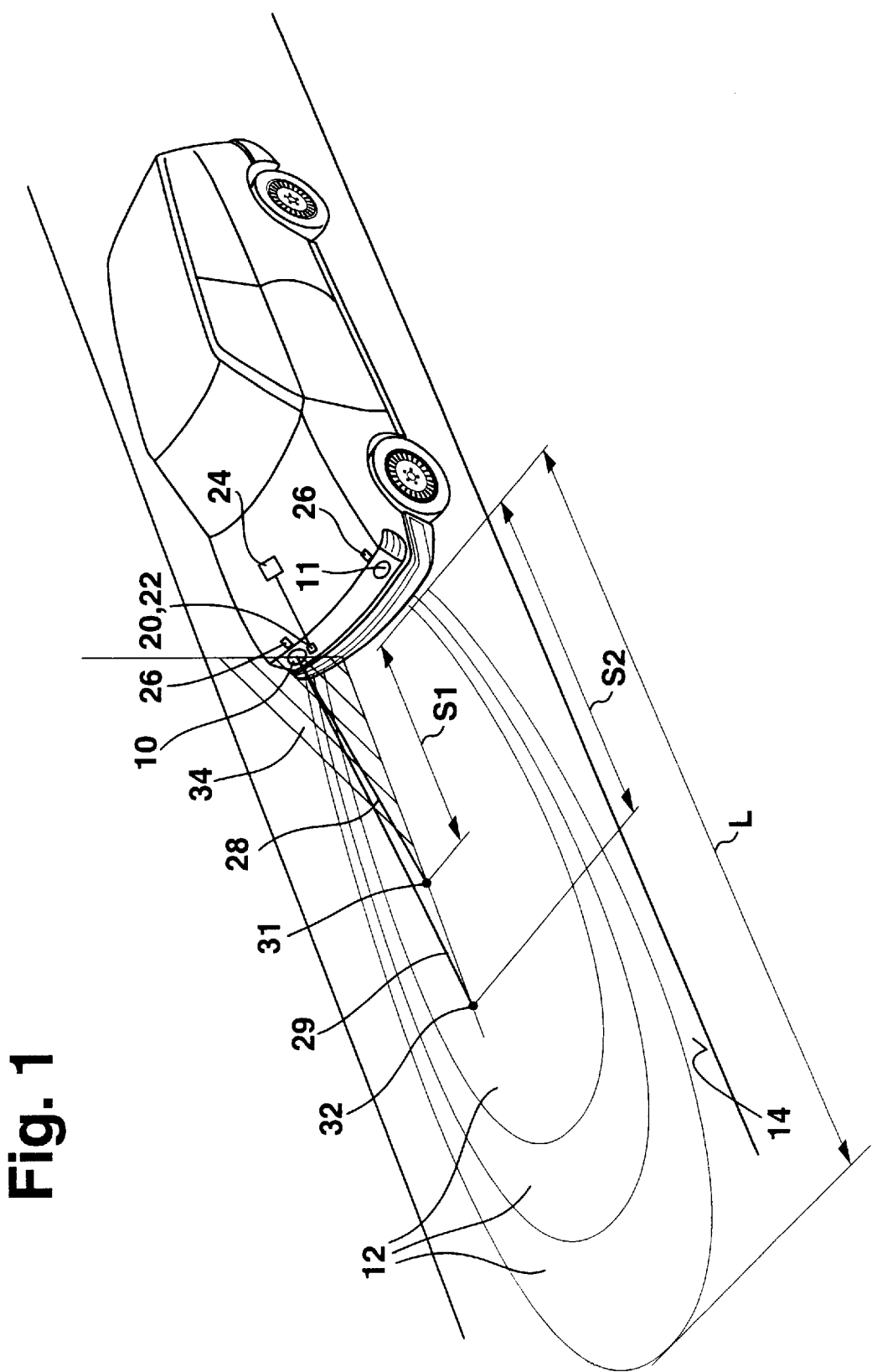
FIG. 1 is a perspective view of a vehicle having one embodiment of the headlight illumination field regulating apparatus of the present invention and schematically showing a coordinate reference system to facilitate an understanding of the apparatus and its operation.

As seen in FIG. 1, a vehicle schematically represented as an automobile is traveling on a road surface road 14 and the automobile has a pair of headlights 10, 11 on its front end for illuminating a illumination field frontward of the automobile. The headlights 10, 11 can be of the type for producing a blended light exclusively or, alternatively, of the type for producing both a blended light and a far distance illuminating beam. As another alternative, the headlight 10, 11 can be of the type for producing light beams of the type considered suitable for fog conditions.

In the event that the headlights 10, 11 are of the type for producing a blended light beam, a light beam 12 is projected by each headlight 10, 11 capable of illuminating a region frontward of the automobile including at least the road 14. The light beam 12 is shown in FIG. 1 schematically by several lines indicating a light beam having equal intensity across its area of projection. To prevent a blinding of a person in an oncoming vehicle, the light beams 12 each have an upper bright-dark border which acts to limit the forwardmost distance of projection of the light beam 12 to a predetermined spacing or projection limit L from the automobile. The L represents thus the projection limit of the headlights 10, 11. In the event of changing load characteristics of the automobile or in the event of road and travel related conditions such as, for example, braking and accelerating of the automobile or unevenness of the road surface, corresponding changes in the tilt or inclination of the automobile in a front and rear manner produce corresponding changes in the projection limit of the headlights 10, 11 and the position of the bright-dark border changes. As a result, either the frontward illuminated area frontward of the automobile is not sufficiently illuminated, if the projection limit is too small, or a blinding or an oncoming driver can occur, if the projection limit is too large. In accordance with the present invention, an illumination field regulating apparatus is provided to maintain the projection limit L at a constant value independent of the tilt or inclination characteristic of the vehicle.

The headlight illumination field regulating apparatus can be operatively coupled to the assembly which controls the operation of the headlights 10, 11 so that the headlight illumination field regulating apparatus is operated in conjunction with the operation of the headlights 10, 11 or, alternatively, the headlight illumination field regulating apparatus can be continuously operated during vehicle operation. The headlight illumination field regulating apparatus includes an electromagnetic radiation emitter 20, a reflected radiation sensor 22, an evaluation unit 24, and a unit 26 for adjusting the alignment position of the headlights 10, 11 in response to information evaluated by the headlight illumination field regulating apparatus.

In the one embodiment of the headlight illumination field regulating apparatus as shown in FIG. 1, the spots 31, 32 are detected by the sensor 22 and signals are generated by the radiation emitter 20 or the sensor 22 representative of the spacings s1, s2 of the spots 31, 32 from the front of the vehicle. These signals are transmitted to the evaluation member 24 for evaluation thereby.

The sensor assembly 22 of the headlight illumination field regulating apparatus is disposed near or preferably in one of the headlights 10, 11 on the front of the automobile. In the one embodiment of the headlight illumination field regulating apparatus as shown in FIG. 1, the spots 31, 32 are detected by the sensor 22 and signals are generated by the radiation emitter 20 or the sensor 22 representative of the spacings s1, s2 of the spots 31, 32 from the front of the vehicle. These signals are transmitted to the evaluation member 24 for evaluation thereby.

The electromagnetic radiation emitter 20 of the headlight illumination field regulating apparatus includes two spaced apart radiation senders 28, 29 which are disposed on the front end of the automobile preferably each ntegrated into a respective one of the headlights 10, 11. The radiation beam pairs of each radiation emitters 28, 29 act to irradiate two spots or areas 31, 32 to be sensed on the road 14. The radiation emitter 28, which is on the right side of the automobile as viewed in the direction of travel mounted integral with the headlight 10, acts to irradiate a spot 31 at a spacing s1 from the front of the automobile. The radiation emitter 29 acts to irradiate a spot 32 at a spacing s2 from the front of the automobile. The radiation beams sent out by the radiation emitters 28, 29 travel in a common vertical plane vertical plane 34 such that the spots 31, 32 irradiated by the radiation emitters 28, 29 lie at different spacings s1, s2 from each other relative to the direction of travel of the vehicle yet are both in the common vertical plane 34. The sensor assembly 22 of the headlight illumination field regulating apparatus is disposed near or preferably in one of the headlights 10, 11 on the front of the automobile.

In the one embodiment of the headlight illumination field regulating apparatus as shown in FIG. 1, the spots 31, 32 are detected by the sensor 22 and signals are generated by the radiation emitter 20 or the sensor 22 representative of the spacings s1, s2 of the spots 31, 32 from the front of the vehicle. These signals are transmitted to the evaluation member 24 for evaluation thereby.

Figure 3:
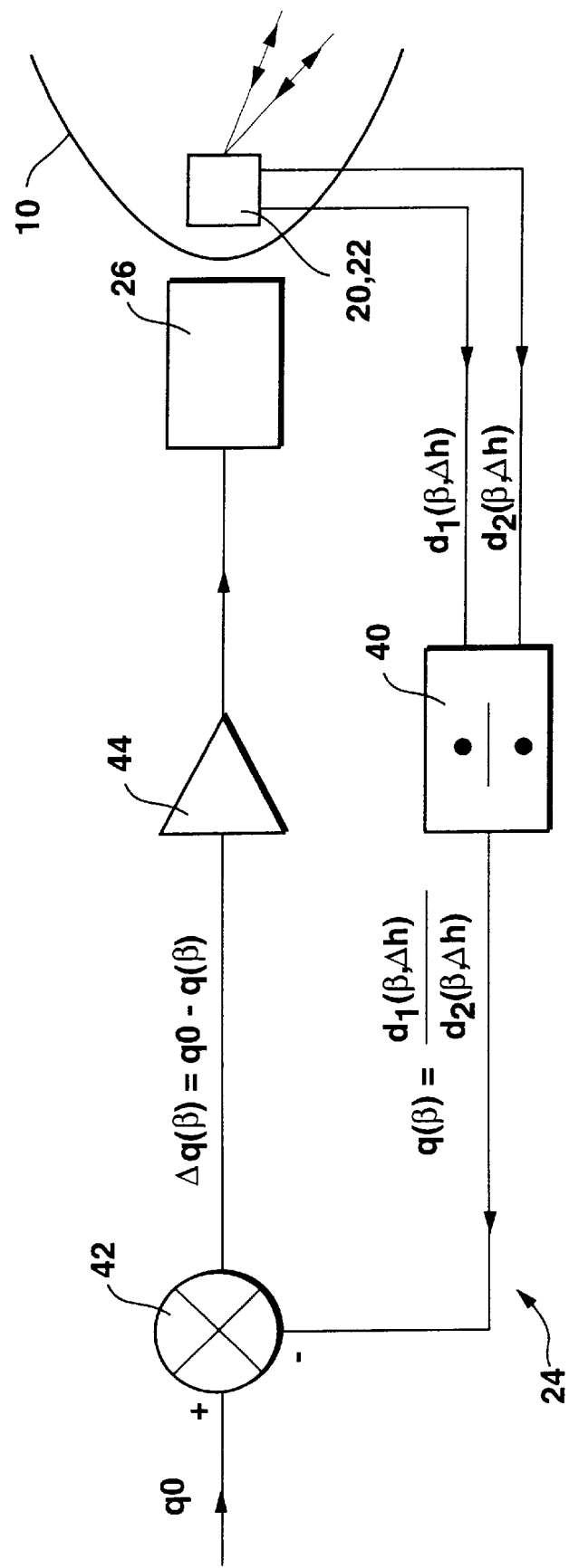
FIG. 3 is a simplified schematic view of the elements of the apparatus shown in FIG. 1 for regulating the position of a headlight based upon evaluated positional information.

As seen in FIG. 3, the evaluation unit 24 includes a spacing ratio analyzer 40 in which the q() of the spacing s1 relative to the spacing s2 is evaluated. A signal comprising information concerning the q() is transmitted to the compactor 42 at which the actual or instantaneous q() is compared with a predetermined qO which is the desired ratio q which should obtain in the correct position of the illumination field of the headlights 10, 11. It is at this correct position that the spots 31, 32 are located at predetermined spacings from the vehicle. The comparator 42 creates a signal representative of the q()=qO−q() indicating the deviation of the actual or instantaneous q() from the predetermined qO and this signal is transmitted to the headlight regulation control device 44. To the extent that the q() is not zero, the headlight regulation control device 44 controls the unit 26 for adjusting the alignment position of the headlights to so adjust the orientation of the headlights 10, 11 on the vehicle that the q is reduced to zero.

Figure 2:
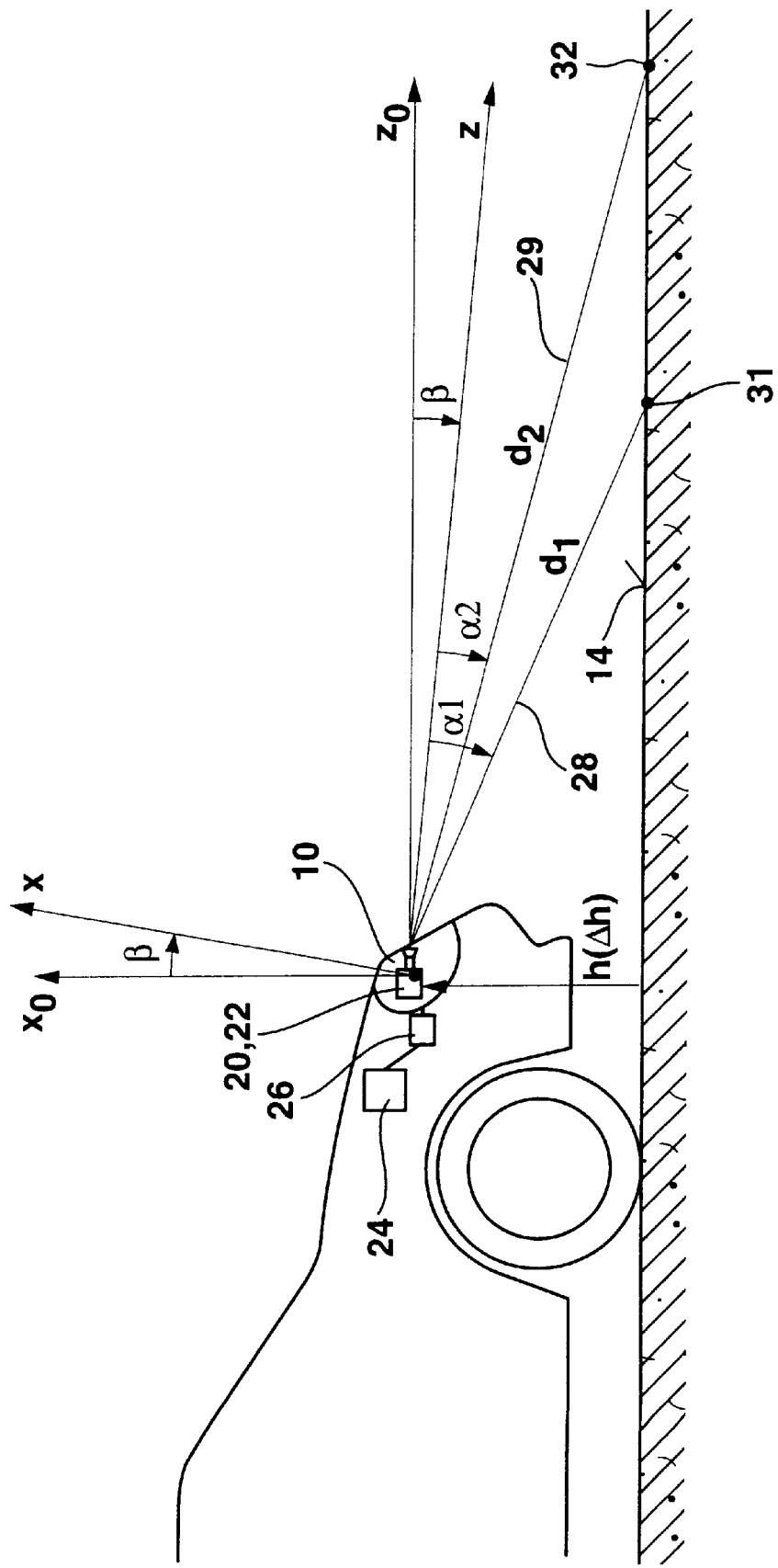
FIG. 2 is a side elevational view of a front portion of the vehicle shown in FIG. 1 and showing, in partial vertical section, a signal sending unit of the apparatus and a headlight to which the apparatus is operatively connected.

As seen in FIG. 2, there is a relationship between the inclination of the vehicle and the spacing of the spots 31, 32 from the front of the vehicle. The spot 31, which is at a spacing s1 from the vehicle as measured along the road 14, is at a radiation beam spacing d1 measured along the beam 28 from the sensor 22. The spot 32, which is at a spacing s2 from the vehicle as measured along the road 14, is at a radiation beam spacing d2 measured along the beam 29 from the sensor 22. As seen in FIG. 2, a first coordinate system includes a horizontal axis ZO and a vertical axis XO and these axes are fixed with respect to the road 14. A second coordinate system includes a horizontal axis Z and a vertical axis X and these axes are fixed relative to the vehicle such that their orientations change in correspondence with changes in the orientation of the vehicle.

In the event that the vehicle tilts or is inclined, an angle is measurable between the axis horizontal axis ZO and the axis vertical axis X and the same angle is also measurable between the axis horizontal axis ZO and the axis horizontal axis horizontal axis Z. The beams 28, 29 travel from the emitter 20 along paths which are below the horizontal axis ZO—in other words, the beam travel paths are at greater angles to the horizontal axis ZO than the angle. The beam 28 forms an angle 1 relative to the horizontal axis ZO and the beam 29 forms an angle 2 relative to the horizontal axis ZO.

A change in the inclination of the vehicle may occur due to a change in the load characteristic of the vehicle, braking or acceleration of the vehicle, or unevenness of the road surface 14 and this inclination change is measurable as the angle, as well as by the changes in the beam spacings d1 and d2 of the spots 31, 32, respectively. During any of these inclination influencing events, however, a change h in the height of the radiation emitter 20 and the sensor 22 relative to the road 14 will also occur and this h as well causes a change in the beam spacings d1 and d2 of the spots 31, 32, respectively.

The following equations demonstrate the relationship of the angle 1 and the angle 2 of the angle as well as the h with reference being drawn to the sides and angles of a right angled triangle:

$$\sin(1+) = h\ (h)/d1(h,) \tag{1}$$

$$\sin(2+) = h(h)/\ d2(h,) \tag{2}$$

From the above equations, the spacings d1 and d2 can be expressed as follows:

$$d1(h,\ ) = h\ (h)/\sin(1+) \tag{3}$$

$$d2(h,\ ) = h\ (h)/\sin(2+) \tag{4}$$

Thus, it can be seen that the spacings d1 and d2 are dependent upon the inclination angle and the h. However, if the spacings d1 and d2 are expressed in the following manner:

$$q()=d1(h_s)/d2(h_s)=\sin(2+)/\sin(1+) \quad (5)$$

it can be seen that the q() is only dependent upon the angle. For a relatively small angle, the following simplification for Equation (5) can be made:

$$\sin(1+)=\sin(1)+\cos(1) \quad (6)$$

$$\sin(2+)=\sin(2)+\cos(2) \quad (7)$$

The Equations (6) and (7) can be substituted into Equation (5) to yield the following equation:

$$q()=[\sin(2)+\cos(2)]/[\sin(1)+\cos(1)] \quad (8)$$

In accordance with the above Equations (1)–(8), the evaluation of the q() can be undertaken and the desired ratio qO can be compared to the q() in order to obtain the q. In a variation, there can be provided only a single radiation emitter 20 and a sensor 22 as well as an evaluation unit 24 which can be mounted, for example, in the headlight 10. The evaluation unit 24 is connected with the 26 of the other headlight 11 so that both headlights can be adjusted to achieve the proper illumination limit. It is assumed with this variation that the headlights 10, 11 are initially set to provide the same illumination limit. Alternatively, it can also be provided that a radiation emitter 20 is mounted in each of the headlights 10, 11 and coupled to a sensor 22 and an evaluation unit 24. In this configuration, the initial orientation of the respective illumination limits of the two headlights 10, 11 do not need to coincide.

The height h of the installed position of the radiation emitter 20 relative to the road 14 can be determined from the foregoing Equations (1)–(2). If two radiation emitters 20 and two sensors 22 with an accompanying evaluation unit 24 are provided, the two different points having a height over the road can be evaluated. Additionally, the rotational angle of the vehicle—namely, its rotation around a horizontal axis—can be determined. The information concerning the inclination of the vehicle, as well as its height over the road and its rotational angle, can be used, for example, to regulate the horizon or levelness of the vehicle or for other dynamic vehicle regulation processes.

Figure 4:
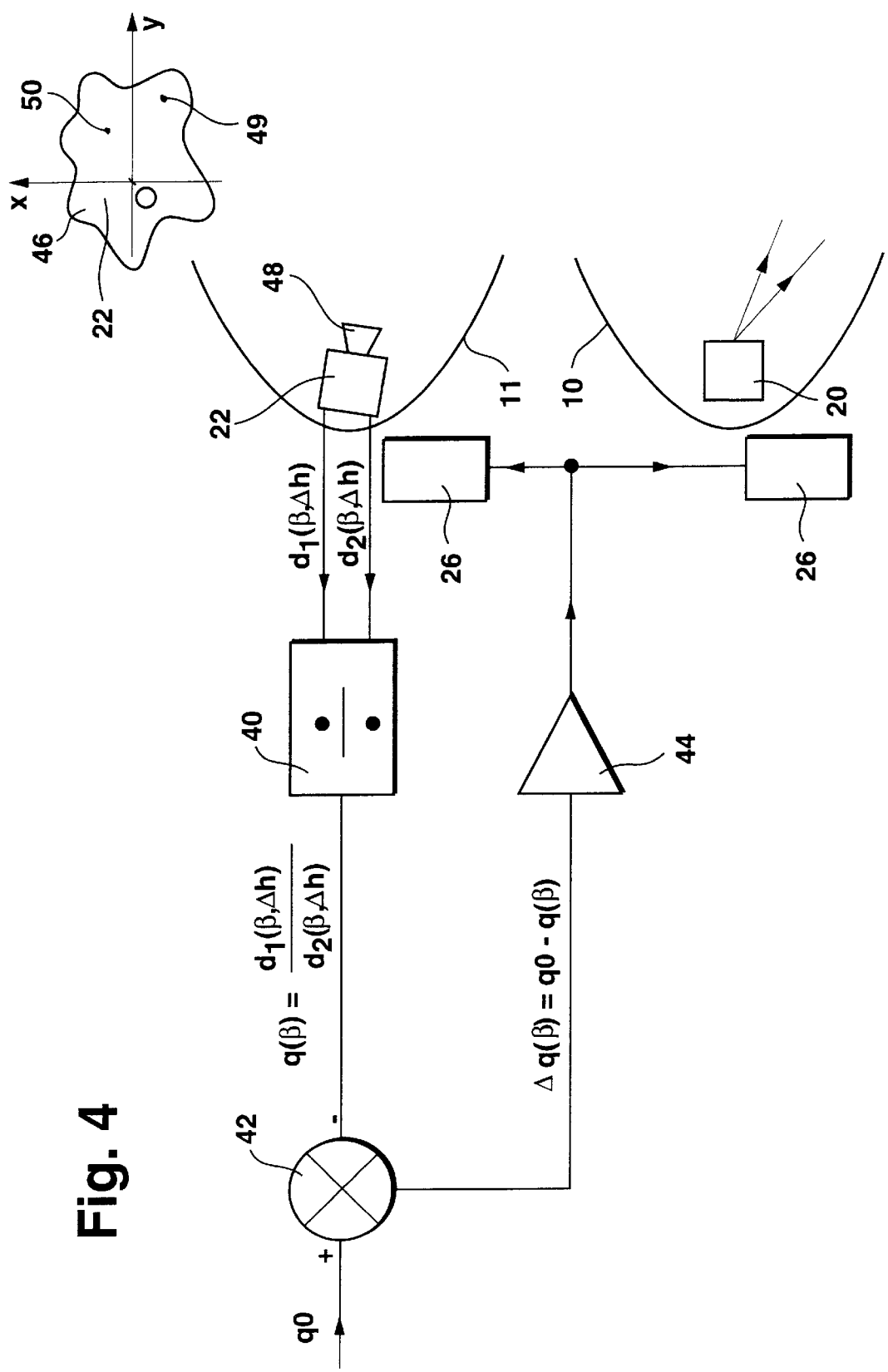
FIG. 4 is a simplified schematic view of the elements of the apparatus shown in FIG. 1 for emitting radiation beams to determine the illumination field position and the elements for evaluating positional information.

The radiation emitter 20 of the headlight illumination field regulating apparatus can be configured as described in the one embodiment shown in FIG. 1 and the another embodiment shown in FIG. 4 to emit electromagnetic radiation beams 28, 29 whereby the light can be non-visible or visible light. The sensor 22 is correspondingly configured as an optic electronic sensor and included one or a plurality of beam sensitive elements 46. The sensor 22 is mounted on the vehicle at a spacing from the radiation emitter 20 whereby the optical axes of the sensor 22 and the emitter 20 deviate from another. As an example, the emitter 20 can be integrated into the headlight 10 and the sensor 22 can be integrated into the other headlight 11. The beam sensitive elements 46 of the sensor 22 can be selectively configured as photo diodes, photocells or as CCD-cells (Charge-coupled-device cells) and the configuration can be arranged linearly or in a matrix. The sensor 22 includes an optic guide 48 which guides the reflected beams to the elements 46 whereby the beams are guided to the elements 46 in dependence upon their entry direction. Alternatively, the sensor 22 can also be configured as a position sensor such as, for example, in the form of a PSD (position sensing device).

In the illustrated embodiment, the sensor 22 includes a plurality of matrix style distributed elements 46. The spots 31, 32 are represented in this configuration as data points 49, 50. The positions of the spots 31, 32 are thus represented by the data points 49, 50 and these are correspondingly also representative of the beam spacings d1, d2 to the spots. The evaluation unit 24 then provides, as previously described, a signal for the actual or instantaneous q() and this q() is compared with the desired ratio qO and, subsequently, an adjustment of the headlights 10, 11 is undertaken by the unit 26 for adjusting the alignment position of the headlights, if needed.

Figure 5:
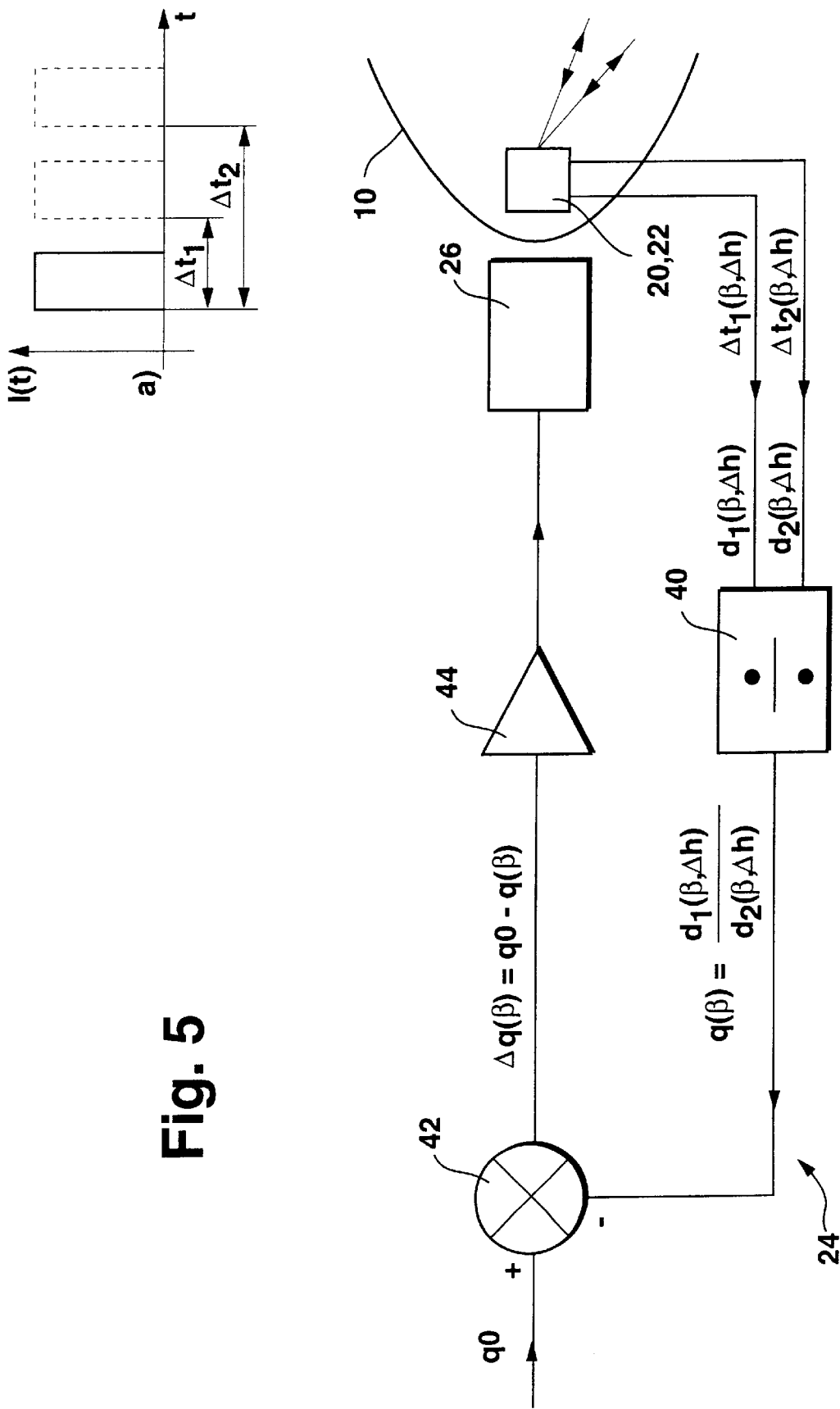
FIG. 5 is a simplified schematic view of the elements of another embodiment of the apparatus and showing elements thereof for emitting radiation beams to determine the illumination field position and the elements for evaluating positional information.

In another variation of the headlight illumination field regulating apparatus of the present invention, the sensor 22, which serves to sense the reflected beams from the spots 31, 32 and to create the data points 49, 50 representing the spots, can also be configured, as seen in FIG. 5, to sense the spots by evaluating the durations t1 and t2, each of which is the duration or length of time between the emission of the one of the beams 28, 29 by the emitter 20 and the receipt of the reflected beam at the sensor 22. As seen in part a) of FIG. 5 as solid lines, a plot of the intensity I(t) of the reflected beam is shown. For the beam reflected back from the spot 31, a duration t1 is determined and, for the beam reflected back from the spot 32, a duration t2 is determined. The spacings d1 and d2 can be determined from these durations t1 and t2, taking into account the speed of diffusion of the beams 28, 29 and that of the reflected beams. The beams 28, 29 in this variation are not continuously emitted from the emitter 20 but are, instead, emitted in a pulsed manner and a duration evaluation is performed for each pulsed beam. The emitter 20 can include several light diodes, including, in particular, laser diodes, for emitting the beams.

Figure 6:
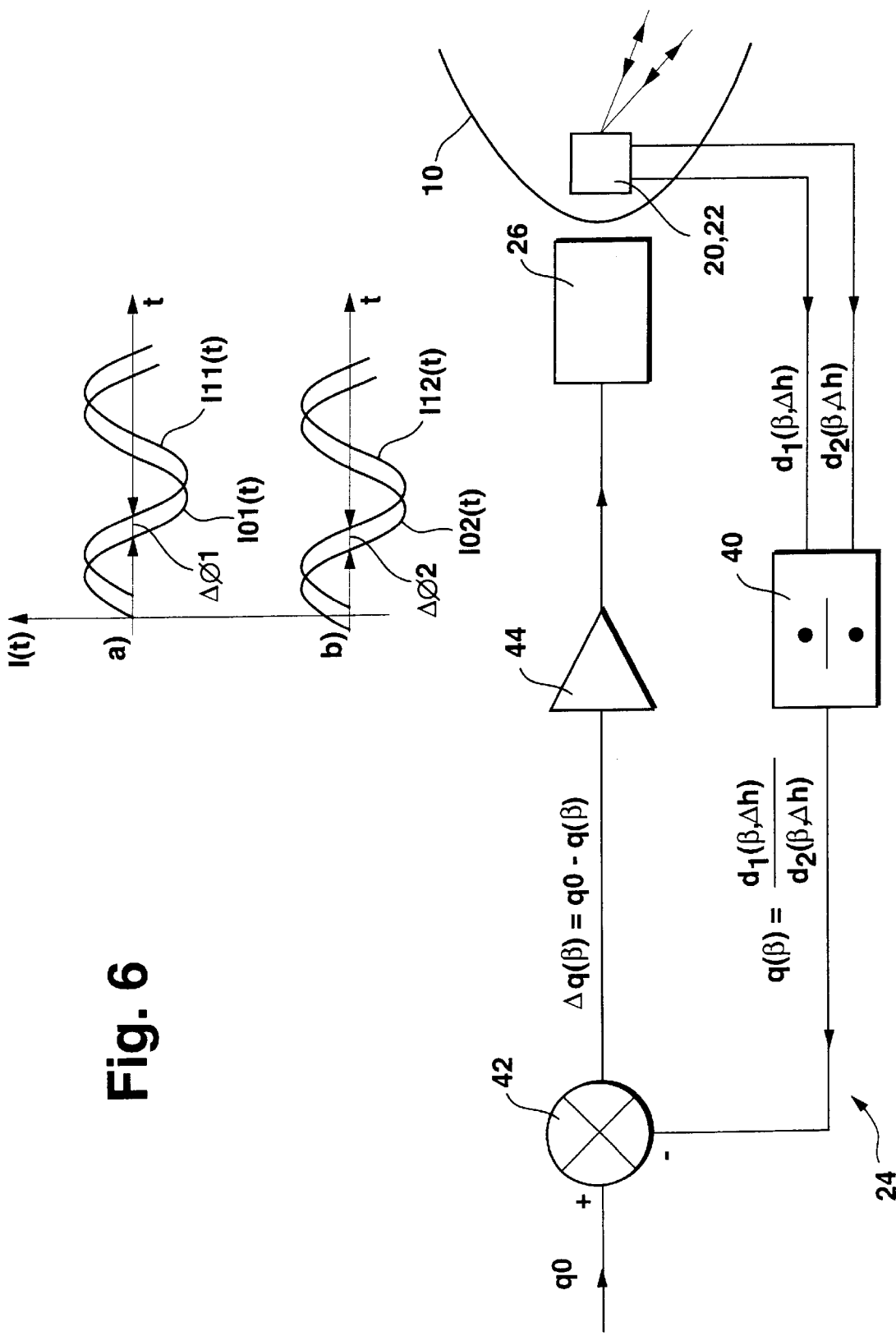
FIG. 6 is a simplified schematic view of the elements of a further embodiment of the apparatus and showing elements thereof for emitting radiation beams to determine the illumination field position and the elements for evaluating positional information.

A further variation of the process for evaluating the spacings d1 and d2 of the spots 31, 32 is shown in FIG. 6 in which a further embodiment of the headlight illumination field regulating apparatus is illustrated. In this embodiment of the headlight illumination field regulating apparatus, the emitter 20 emits the beams 28, 29 with a phase modulation, whereby the intensity of the beams 28, 29 changes with a predetermined frequency. The reflected beams reflected from the spots 31, 32 exhibit a phase modulation which is, however, shifted relative to the phase modulation of the beams 28, 29. The difference in the phase modulations of the reflected beams and the emitted beams is a measure for the duration between the emission and the receipt of the beams and is in this way a measure of the spacings d1 and d2 of the spots 31, 32. As seen in part a) of FIG. 6, a plot of the intensity I01 (t) of the first beam 28 as well as a plot of the intensity I11(t) of the reflected beam reflected by the spot 31 is shown. A phase difference 1 is measurable between these two plots. As seen in part b) of FIG. 6, the plot of the intensity I02(t) of the second beam 29 as well as a plot of the intensity I12(t) of the reflected beam reflected by the spot 32 is shown. A phase difference 2 is measurable between these two plots. The phase differences 1 and 2 are thus proportional to the spacings d1 and d2 of the spots 31, 32, whereby the signal generated by the sensor 22 based upon the phase differences can be evaluated by the evaluation unit 24.

With respect to the further and another embodiments of the headlight illumination field regulating apparatus disclosed herein, the beams 28, 29 can be electromagnetic beams comprised of visible or non-visible light. Alternatively, the beams 28, 29 can be electromagnetic beams in the form of microwaves. The use of electromagnetic beams offers the advantage that the determination of the spacings d1 and d2 can be accomplished relatively rapidly on the order of 1 millisecond or less and the adjustment of the illumination field can be accomplished in a correspondingly rapid manner, even in the event of relatively short duration changes in the inclination of the vehicle. Moreover, the beams 28, 29 can alternatively be configured as sound waves, especially ultrasound waves.

We claim:

1. An apparatus for regulating the illumination field of a running light of a vehicle, the running light being of the type for illuminating a region forward of the vehicle relative to the vehicle direction of travel and the vehicle being of the type having an adjusting element for adjusting the orientation of the running light to thereby vary the position of the illumination field relative to the vehicle, comprising: a member for irradiating at least a first and a second area on the road surface with a first and a second radiation beam, respectively, in a manner in which at least some of the radiation beam is reflected from the respective irradiated area, the first area on the road surface being at a different spacing from the vehicle than the second area relative to the direction of travel of the vehicle; a sensor for sensing a characteristic of radiation reflected from the irradiated first and second areas on the road surface; means for determining a relationship of a sensed characteristic of radiation reflected from the first area on the road with a sensed characteristic of radiation reflected from the second area on the road; and means for comparing the determined relationship of the sensed reflected radiation characteristics with a radiation characteristic representative of a predetermined proper position of the illumination field of the running light, the comparing means being operatively connected with the adjusting element for providing a signal thereto in response to which the adjusting element can adjust the orientation of the running light on the vehicle and thereby reorient the running light into a position in which the light projected therefrom illuminates the proper illumination field, the irradiating member being operable to emit electromagnetic beams, the sensing means being an optic electronic sensor and the comparing means including means for creating respective data points which are representative of the sensed reflected radiation characteristics of the first and second areas on the road and means for evaluating a position of a data point to create a signal provided to the adjusting element for controlling its adjustment activity.

2. An apparatus according to claim 1 wherein the first and second radiation beams are emitted from substantially the same emission source.

3. An apparatus according to claim 1 wherein the vehicle has two running lights, the irradiating member, the sensing means, the determining means, the comparing means, and the adjusting device are associated with each running light.

4. An apparatus according to claim 1 wherein the vehicle has two running lights, the irradiating member, the sensing means, the determining means, and the comparing means are exclusively associated with one of the running lights, and the comparing means is operable to control the adjusting device to adjust both of the running lights in response to the comparison of the determined relationship of the sensed reflected radiation characteristics and the radiation characteristic of the predetermined proper illumination position of the running lights.

5. An apparatus according to claim 1 wherein the first and second radiation beams travel in the same vertical plane.

6. An apparatus for regulating the illumination field of a running light of a vehicle, the running light being of the type for illuminating a region forward of the vehicle relative to the vehicle direction of travel and the vehicle being of the type having an adjusting element for adjusting the orientation of the running light to thereby vary the position of the illumination field relative to the vehicle, comprising: a member for irradiating at least a first and a second area on the road surface with a first and a second radiation beam, respectively, in a manner in which at least some of the radiation beam is reflected from the respective irradiated area, the first area on the road surface being at a different spacing from the vehicle than the second area relative to the direction of travel of the vehicle; a sensor for sensing a characteristic of radiation reflected from the irradiated first and second areas on the road surface; means for determining a relationship of a sensed characteristic of radiation reflected from the first area on the road with a sensed characteristic of radiation reflected from the second area on the road; and means for comparing the determined relationship of the sensed reflected radiation characteristics with a radiation characteristic representative of a predetermined proper position of the illumination field of the running light, the comparing means being operatively connected with the adjusting element for providing a signal thereto in response to which the adjusting element can adjust the orientation of the running light on the vehicle and thereby reorient the running light into a position in which the light projected therefrom illuminates the proper illumination field, the radiation member being operable to emit the first and second radiation beams as pulsed beams and the sensing means being operable to sense a time difference between the time at which a radiation beam is emitted and a time of receipt of a beam reflected from the areas so as to determine a position of the areas.

7. An apparatus according to claim 6 wherein the first and second radiation beams are electromagnetic beams.

8. An apparatus according to claim 6 wherein the first and second radiation beams are microwaves.

9. An apparatus according to claim 6 wherein the first and second radiation beams are soundwaves.

10. An apparatus for regulating the illumination field of a running light of a vehicle, the running light being of the type for illuminating a region forward of the vehicle relative to the vehicle direction of travel and the vehicle being of the type having an adjusting element for adjusting the orientation of the running light to thereby vary the position of the illumination field relative to the vehicle, comprising: a member for irradiating at least a first and a second area on the road surface with a first and a second radiation beam, respectively, in a manner in which at least some of the radiation beam is reflected from the respective irradiated area, the first area on the road surface being at a different spacing from the vehicle than the second area relative to the direction of travel of the vehicle; a sensor for sensing a characteristic of radiation reflected from the irradiated first and second areas on the road surface; means for determining a relationship of a sensed characteristic of radiation reflected from the first area on the road with a sensed characteristic of radiation reflected from the second area on the road; and means for comparing the determined relationship of the sensed reflected radiation characteristics with a radiation characteristic representative of a predetermined proper position of the illumination field of the running light, the comparing means being operatively connected with the adjusting element for providing a signal thereto in response to which the adjusting element can adjust the orientation of the running light on the vehicle and thereby reorient the running light into a position in which the light projected therefrom illuminates the proper illumination field, the radiation member being operable to emit the first and second beams with a phase modulation and the sensing means being operable to sense a phase shift between the emitted beams and the beams.

11. An apparatus according to claim 10, wherein the first and second radiation beams are electromagnetic beams.

12. An apparatus according to claim 10, wherein the first and second radiation beams are microwaves.

13. An apparatus according to claim 10, wherein the first and second radiation beams are soundwaves.

* * * * *